(12) United States Patent
Tartagni

(10) Patent No.: US 6,731,120 B2
(45) Date of Patent: *May 4, 2004

(54) CAPACITIVE DISTANCE SENSOR

(75) Inventor: Marco Tartagni, Meldola (IT)

(73) Assignee: STMicroelectronics, S.r.l., Agrate Brianza (IT)

(*) Notice: Subject to any disclaimer, the term of this patent is extended or adjusted under 35 U.S.C. 154(b) by 0 days.

This patent is subject to a terminal disclaimer.

(21) Appl. No.: 09/999,065

(22) Filed: Oct. 30, 2001

(65) Prior Publication Data

US 2002/0180464 A1 Dec. 5, 2002

Related U.S. Application Data

(60) Division of application No. 09/019,496, filed on Feb. 5, 1998, now Pat. No. 6,320,394, which is a continuation-in-part of application No. 08/799,548, filed on Feb. 13, 1997, now abandoned.

(30) Foreign Application Priority Data

Feb. 14, 1996 (EP) .............................. 96830068

(51) Int. Cl.[7] .............................. G01R 27/26
(52) U.S. Cl. ..................................... 324/662
(58) Field of Search ................. 324/687, 661, 324/662, 663, 671, 686, 688, 124

(56) References Cited

U.S. PATENT DOCUMENTS

| 3,493,855 | A | 2/1970 | Norwich | 324/664 |
|---|---|---|---|---|
| 3,641,431 | A | 2/1972 | Pigage et al. | 324/662 |
| 3,781,855 | A | 12/1973 | Killen | 382/126 |
| 3,873,927 | A | 3/1975 | Overall | 324/667 |
| 3,967,310 | A | 6/1976 | Horiuchi et al. | 257/637 |
| 4,016,490 | A | 4/1977 | Weckenmann et al. | 324/671 |
| 4,096,758 | A | 6/1978 | Moore | 73/718 |

(List continued on next page.)

FOREIGN PATENT DOCUMENTS

| EP | 0 226 082 | 6/1987 |
|---|---|---|
| EP | 0 397 244 A3 | 11/1990 |
| EP | 0 397 244 B1 | 11/1990 |
| EP | 0 397 244 A2 | 11/1990 |
| EP | 0 454 883 B1 | 6/1991 |
| EP | 0 455 070 B1 | 6/1991 |
| EP | 0 710 593 A1 | 5/1996 |
| EP | 0 779 497 A3 | 6/1997 |
| EP | 0 779 497 A2 | 6/1997 |
| EP | 0 786 745 A3 | 7/1997 |

(List continued on next page.)

OTHER PUBLICATIONS

Sarma and Barranger, Capacitance–Type Blade–Tip Clearance Measurement System Using a Dual Amplifier with Ramp/DC Inputs and Integration, *IEEE* 41(5):674–678, Oct. 1992.

Woffenbuttel and Regtien, "Integrated Tactile Imager with an Intrinsic Contour Detection Option," *Sensors and Actuators* 16:141–153, 1989.

Young et al., "Novel Fingerprint Scanning Arrays Using Polysilicon TFT's on Glass and Polymer Substrates," *IEEE Electron Device Letters*, 8(1):19–20, 1997.

Tartagni et al., "A 390dpi Live Fingerprint Imager Based on Feedback Capacitive Sensing Scheme," *IEEE International Solid–State Circuits Conference*, Feb. 7, 1997, 5 pp.

Primary Examiner—Evan Pert
(74) Attorney, Agent, or Firm—Lisa K. Jorgenson; David V. Carlson; Seed IP Law Group PLLC

(57) ABSTRACT

A distance sensor has a capacitive element in turn having a first plate which is positioned facing a second plate whose distance is to be measured. In the case of fingerprinting, the second plate is defined directly by the skin surface of the finger being printed. The sensor comprises an inverting amplifier, between the input and output of which the capacitive element is connected to form a negative feedback branch. By supplying an electric charge step to the input of the inverting amplifier, a voltage step directly proportional to the distance being measured is obtained at the output.

5 Claims, 4 Drawing Sheets

U.S. PATENT DOCUMENTS

| | | | |
|---|---|---|---|
| 4,161,743 A | 7/1979 | Yonezawa et al. | 257/636 |
| 4,183,060 A | 1/1980 | Barnette et al. | 324/662 |
| 4,353,056 A | 10/1982 | Tsikos | 382/124 |
| 4,394,773 A | 7/1983 | Ruell | 382/124 |
| 4,428,670 A | 1/1984 | Ruell et al. | 356/71 |
| 4,429,413 A | 1/1984 | Edwards | 382/124 |
| 4,513,298 A | 4/1985 | Scheu | 347/64 |
| 4,571,543 A | 2/1986 | Raymond et al. | 324/425 |
| 4,577,345 A | 3/1986 | Abramov | 382/124 |
| 4,626,774 A | 12/1986 | Regtien | 324/683 |
| 4,656,871 A | 4/1987 | Czarnocki | 73/724 |
| 4,763,063 A | 8/1988 | Shkedi | 324/661 |
| 4,814,691 A | 3/1989 | Garbini et al. | 324/661 |
| 4,935,207 A | 6/1990 | Stanbro et al. | 422/68.1 |
| 4,958,129 A | 9/1990 | Poduje et al. | 324/661 |
| 5,028,876 A | 7/1991 | Cadwell | 324/678 |
| 5,325,442 A | 6/1994 | Knapp | 382/124 |
| 5,373,181 A | 12/1994 | Scheiter et al. | 257/415 |
| 5,430,381 A | 7/1995 | Dower | 324/452 |
| 5,467,022 A | 11/1995 | Aoki et al. | 324/661 |
| 5,530,581 A | 6/1996 | Cogan | 359/265 |
| 5,659,626 A | 8/1997 | Ort et al. | 382/125 |
| 5,778,089 A | 7/1998 | Borza | 382/124 |
| 5,828,773 A | 10/1998 | Setlak et al. | 382/126 |
| 5,844,415 A | 12/1998 | Gershenfeld et al. | 324/663 |
| 5,852,670 A | 12/1998 | Setlak et al. | 382/126 |
| 5,862,248 A | 1/1999 | Salatino et al. | 382/124 |
| 5,869,791 A | 2/1999 | Young | 178/20.01 |
| 5,903,225 A | 5/1999 | Schmitt et al. | 340/825.31 |
| 5,920,640 A | 7/1999 | Salatino et al. | 382/124 |
| 5,936,412 A | 8/1999 | Gershenfeld et al. | 324/663 |
| 5,973,623 A | 10/1999 | Gupta et al. | 341/33 |
| 6,011,859 A | 1/2000 | Kalnitsky et al. | 382/124 |
| 6,025,726 A | 2/2000 | Gershenfeld et al. | 324/671 |
| 6,051,981 A | 4/2000 | Gershenfeld et al. | 324/663 |
| 6,066,954 A | 5/2000 | Gershenfeld et al. | 324/671 |
| 6,114,862 A | 9/2000 | Tartagni et al. | 324/662 |

FOREIGN PATENT DOCUMENTS

| | | |
|---|---|---|
| EP | 0 786 745 A2 | 7/1997 |
| EP | 0 790 479 A1 | 8/1997 |
| EP | 0 791 899 A3 | 8/1997 |
| EP | 0 791 899 A2 | 8/1997 |
| GB | 2279756 A | 1/1995 |
| GB | 2279757 A | 1/1995 |
| GB | 2312514 A | 10/1997 |
| WO | WO 97/40744 | 11/1997 |
| WO | WO 98/49691 | 11/1998 |
| WO | WO 99/28701 | 6/1999 |

CAPACITIVE DISTANCE SENSOR

CROSS-REFERENCE TO RELATED APPLICATION

This application is a division of U.S. patent application Ser. No. 09/019,496 filed Feb. 5, 1998, now U.S. Pat. No. 6,320,334, entitled "Capacitive Distance Sensor, which was a continuation-in-part of U.S. patent application Ser. No. 08/799,548, entitled "Capacitive Distance Sensor," filed Feb. 13, 1997, now abandoned. Additionally, this application is related to U.S. patent application Ser. No. 09/179,923, filed Oct. 27, 1998, now U.S. Pat. No. 6,362,633.

TECHNICAL FIELD

The present invention relates to a capacitive distance sensor, in particular, a small-distance (micrometric to millimetric) sensor.

BACKGROUND OF THE INVENTION

Small-distance sensors are used, among other things, as pressure, proximity, roughness, mechanical stress and acceleration sensors, for example, in integrated microphony and for acquiring fingerprints.

For fingerprint acquisition in particular (to which reference is made herein purely by way of example of a preferred application of the present invention), known sensors include various types, such as optical, piezoelectric, variable-conductance, thermal, ultrasonic and capacitive, the most promising of which in terms of precision, size, production and cost are capacitive sensors.

Capacitive sensors are based on the principle that the capacitance between two plates is inversely proportional to the distance between them, so that, using the contacting dermal tissue itself as the second plate of the sensor capacitor, and by determining the capacitance, it is possible to locate the ridges and grooves of the fingerprint. This is the principle used in U.S. Pat. No. 5,325,442 to Knapp, which relates to a sensor comprising an array of elementary cells, each comprising a sensitive electrode and an electronic switching device. The electrode is coated with dielectric material, such as passivation oxide or a polymer compound, onto which the epidermis is placed. When a cell is selected, a predetermined variation in potential is applied to the electrode to induce at the terminals an appropriate variation in charge. The extent of variation in charge depends on the capacitance associated with the electrode and is read by amplifying elements connected to the output of the device. To improve efficiency, the above patent suggests a surface grid connected to a reference potential to appropriately bias the skin tissue.

In the above known capacitive sensor, the capacitance between the plates of a capacitor varies in inverse proportion to the distance between the plates, which therefore poses the problem of normalizing the resulting data. In particular, if the capacitance being measured is very small, as in the application in question, serious difficulty is encountered in detecting the charge and discriminating between the various intermediate charge levels corresponding to different gray levels of the image to be generated in the presence of a low signal/noise ratio.

SUMMARY OF THE INVENTION

It is an object of the present invention to provide a sensor designed to overcome the drawbacks typically associated with known technology.

A preferred embodiment of the present invention is directed to a capacitive distance sensor for measuring small distances. The distance sensor includes a first plate positioned facing a second plate such that the first and second plates define a distance to be measured therebetween and form a capacitive element therebetween. The distance sensor also includes an amplifier having an input and an output. The capacitive element is connected between the input and the output to form a negative feedback branch.

In practice, according to the present invention, the detecting capacitor, the distance between the plates of which is to be determined, is placed in a negative feedback loop, thus inverting between the denominator and the numerator the dependence of the output voltage on the distance between the plates.

A preferred embodiment of the present invention is directed to a sensor device, integrated on a single semiconductor chip, that senses a distance between the sensor device and an object such as a human finger. The sensor device includes first and second coplanar plates positioned adjacent to the object to form first and second capacitances between the object and the first and second plates, respectively. The sensor device includes an amplifier having an input connected to the first plate and an output connected to the second plate to form a negative feedback branch that includes the first and second capacitances.

Fingerprint and other biometric sensors formed in accordance with the present invention will have application in preventing the unauthorized use of cellular phones, laptop computers, automobiles, automated teller machines, credit/debit card readers, POS terminals, and smart cards. They are also useful in authenticating electronic financial transactions, personal e-mail, providing access to buildings, etc. Biometric identification, such as personal identification and authentication alternatives which could be accomplished by mounting a sensor as taught by the present invention include hand or finger shape, facial shape, and facial features. In addition, the sensor device of the present invention could be used for non-biometric sensing, such as handwriting detection, switch actuation, and any other device requiring sensitivity to object proximity.

DETAILED DESCRIPTION OF THE INVENTION

Figure 1:
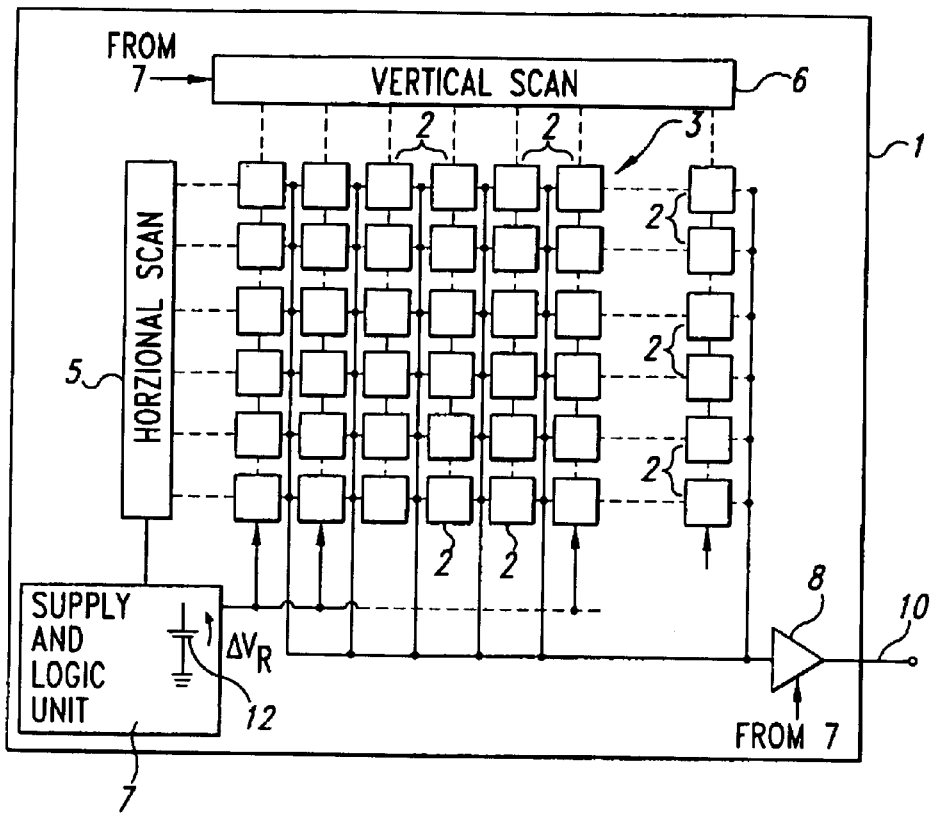
FIG. 1 shows a sensor device for acquiring personal feature scans, such as fingerprints.

FIG. 1 shows a sensor device 1, preferably embodied in an integrated chip, comprising a number of cells 2 arranged to form an array 3 and each constituting an elementary sensor. The simplicity of the individual cells 2 enables the sensor device 1 to be implemented in integrated from on a single semiconductor chip.

The sensor device 1 also comprises a horizontal scanning stage 5 and a vertical scanning stage 6 for enabling one of the cells 2 at a time according to a predetermined scanning pattern. Preferably, to read the cells, stages 5, 6 enable the outputs of the cells 2 sequentially, and comprise shift registers. Alternatively, other cell reading devices could be employed, such as a random access decoder that reads addressed cells rather than sequentially scanning the cells 2.

The sensor device 1 also comprises a supply and logic stage 7, which supplies the components of the device with power (including the cells 2), feeds the necessary reference voltages, and controls the sequence of steps provided for (as explained in detail below). In particular, FIG. 1 shows that the supply and logic stage 7 includes a voltage source 12 for generating a reference voltage variation $\Delta V_R$. A buffer 8 is connected to the outputs of all the cells 2, and supplies sequentially, at output 10 of the sensor array 3, the signals present at the outputs of the cells 2 enabled by scanning stages 5, 6.

Figure 2:
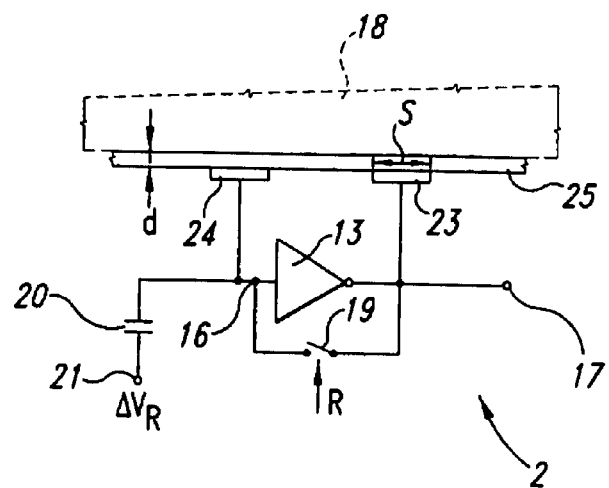
FIG. 2 shows a detail of a cell of the sensor device shown in FIG. 1.

As shown in FIG. 2, each cell 2 comprises a low-power inverting amplifier 13 of gain A, in turn presenting an input 16 at input voltage $V_i$, and an output 17, at output voltage $V_o$, which also defines the output of cell 2. Each cell 2 also includes first and second plates 23, 24 of equal area positioned facing the skin surface 18 of the finger being printed. Preferably, the first and second plates 23, 24 are coplanar with respect to each other. A reset switch 19 is connected between the input 16 and output 17 of the inverting amplifier 13. An input capacitor 20 is connected between an input 21 of the cell 2 and the input 16 of the inverting amplifier 13.

More specifically, the first and second plates 23 and 24 are respectively connected to the output 17 and the input 16 of the inverting amplifier 13, thus realizing a charge integrator. The first and second plates 23 and 24 are covered with a dielectric insulating layer 25 that covers the face of integrated sensor device 1, including the entire array 3 of cells 2. In use, therefore, skin surface 18 forms a third plate facing the first and second plates 23, 24, and defining with them a pair of series capacitors feedback connected between input 16 and output 17 of inverting amplifier 13. Accordingly, a contact grid is not required to bias the skin surface at constant voltage.

The switch 19 is a controlled switch formed using any known technology (e.g., a MOS switch) and receives a control signal R from the supply and logic stage 7. The input 21 of the cell 2 is also connected to the supply and logic stage 7 to receive a voltage signal $\Delta V_R$ as explained below.

To acquire fingerprints, the skin surface 18 is placed on the surface of integrated sensor device 1, at array 3, to complete the pairs of capacitors forming the feedback loops of amplifiers 13 of all the cells 2. At the start of the measurement, the switches 19 of all the cells are closed, and the voltage level at each of inputs 21 is constant, so that the input voltage $V_i$ of all the cells 2 is brought to the same potential as the output voltage $V_o$, between the supply and ground at a high-gain point or logical threshold Vt of inverting amplifier 13.

Subsequently, the supply and logic stage 7 opens all the switches 19 in parallel, and supplies all the inputs 21 with a voltage step $\Delta V_R$, so that a charge variation $\Delta Q = C_i^* \Delta V_R$ (where $C_i$ is the capacitance of input capacitor 20) is induced at the terminals of each input capacitor 20 to permit a reading, as explained below, of the local distance "d" between the first and second plates 23, 24 and skin surface 18 facing them. Obviously, the local distance "d" varies according to whether the point being measured corresponds to a groove, a ridge or a point between the two.

Scanning stages 5, 6 then sequentially enable the reading of cells 2, so that the voltage signal at the output 10 of the buffer 8 is supplied to a system for representing the distance, in known manner, by means of gray levels, and so providing a three-dimensional display of the skin surface.

The way in which the local distance "d" between the first and second plates 23, 24 of each cell 2 and the third plate formed by the skin surface 18 is detected will now be described with reference to the equivalent electric diagram in FIG. 3.

Figure 3:
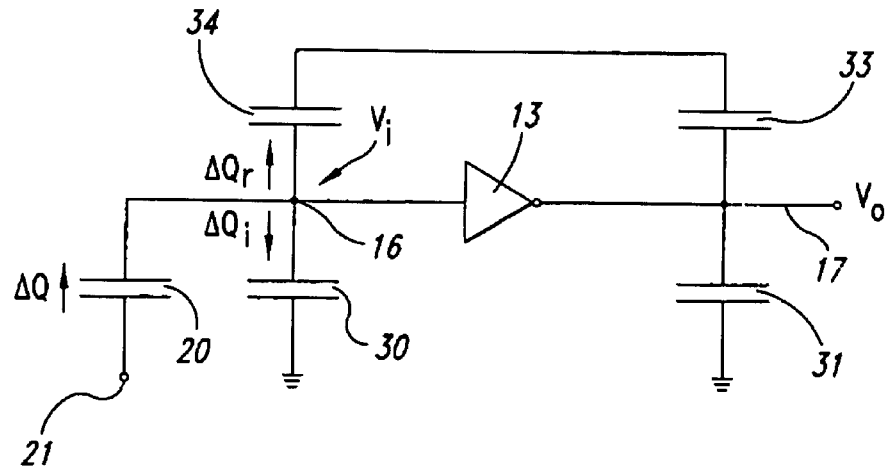
FIG. 3 shows an electric equivalent of the cell shown in FIG. 2.

FIG. 3 shows an equivalent input capacitance 30 and an equivalent output capacitance 31 of the inverting amplifier 13 and the charge flow direction (indicated by the arrows) corresponding to the voltage variations at the plates. FIG. 3 also shows a first feedback capacitor 33 formed by the first plate 23 and the skin surface 18 and a second feedback capacitor 34 formed by the second plate 24 and the skin surface 18.

Assuming $C_I$ is the equivalent input capacitance 30 of inverting amplifier 13; $C_r$ is the total capacitance of the series-connected feedback capacitors 33 and 34; A is the gain of the inverting amplifier 13; $\Delta Q$ is the charge variation induced in the equivalent input capacitance 30 by voltage step $\Delta V_R$; $\Delta Q_i$ is the charge variation stored in the equivalent input capacitance 30 as a result of step $\Delta V_R$; $\Delta Q_r$ is the charge variation in the feedback branch formed by the series connection of the feedback capacitors 33, 34; $\Delta V_i$ is the voltage step at the input 16 of the inverting amplifier 13; $\Delta V_o$ is the corresponding voltage variation at the output 17 (equal to $-A \Delta V_i$); S is the size of the top surface (surface facing the skin surface 18) of each plate 23, 24 of capacitors 33, 34; $\epsilon_o$ is the electric constant (seeing as, in the fingerprinting application, the average distance between the skin surface 18 and the insulating layer 25—typically 60 μm at the grooves—is greater than the thickness of layer 25—typically 2 μm); and "d" is the local distance between plates 23, 24 and skin surface 18 (approximately the same for both plates 23, 24, in view of the very small size of cells 2—typically about 45 μm); then total feedback capacitance $C_r$ is given by the following equation:

$$C_r = \frac{S\varepsilon_0}{2d} \qquad (1)$$

Moreover:

$$\Delta Q = \Delta Q_i + \Delta Q_r = C_I \Delta V_i + C_r(\Delta V_i - \Delta V_o) = -\frac{\Delta V_o}{A}(C_1 + C_r) - \Delta V_o C_r$$

so that:

$$\Delta V_o = -\frac{\Delta Q}{\frac{C_1}{A} + \left(1 + \frac{1}{A}\right)C_r} \qquad (2)$$

Substituting (1) in (2) gives:

$$\Delta V_o = \frac{\Delta Q}{\frac{C_1}{A} + \left(1 + \frac{1}{A}\right)\frac{S\varepsilon_o}{2d}} = -\frac{2\Delta Q d}{\frac{2C_1 d}{A} + \left(1 + \frac{1}{A}\right)S\varepsilon_o} \qquad (3)$$

Assuming $A \gg 1$, (3) becomes:

$$\Delta V_o = d\frac{2\Delta Q}{S\varepsilon_o} \qquad (4)$$

Consequently, by virtue of the negative feedback effected by capacitive coupling the output 17 and input 16 of the inverting amplifier 13 via the skin tissue, the variation in output voltage as a result of the charge step is directly proportional to the distance between the plates 23, 24 and the skin surface 18, in turn dependent on the three-dimensional structure of the skin. For a fixed amount of the input voltage step $\Delta V_i$, the output voltage of the inverter 30 will range between two extremes, depending on feedback capacitance value: (i) the upper saturation level if no feedback capacitance is present; (ii) a value close to the logical threshold when the feedback capacitance is large.

With appropriate amplification levels (e.g., 1000–2000), it is possible to detect differences in capacitance of about ten fF and hence micrometric distances. The output signals of the device according to the invention are therefore such, when converted into gray levels, as to provide a highly reliable representation of the three-dimensional structure of the skin surface.

Figure 4:
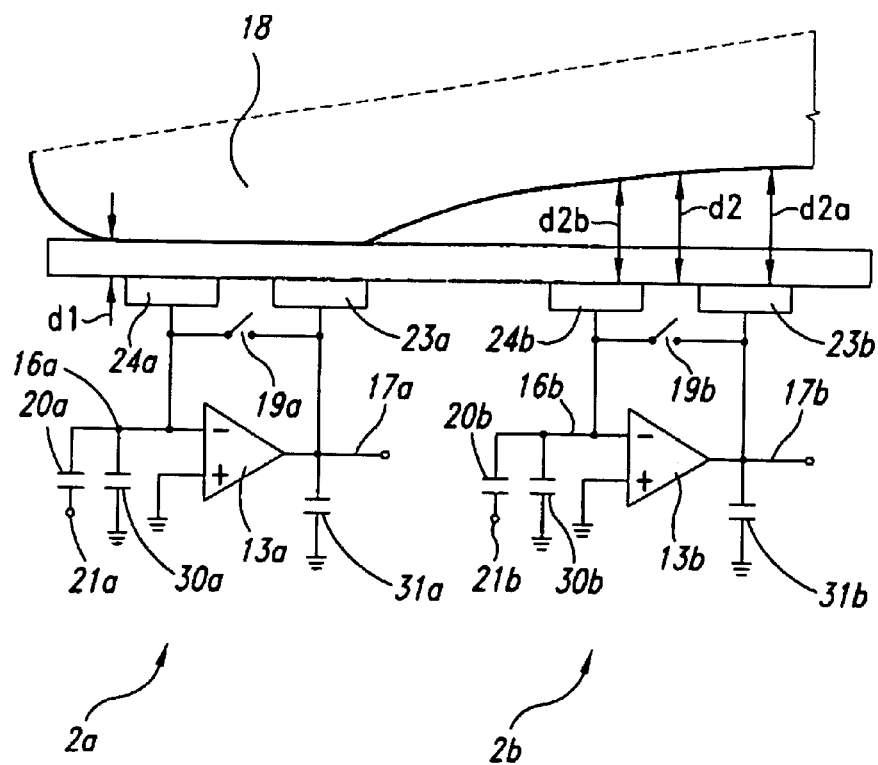
FIG. 4 is an illustration showing a finger positioned on two adjacent cells of the sensor device shown in FIG. 1.

The operation of the sensor device 1 can be further appreciated with regard to FIG. 4, which is an illustration of the skin surface 18 positioned on first and second adjacent cells 2A, 2B of the sensor device 1. It is to be understood that the present invention will have application to thumbs, palms, and any contact surface where an image is desired. Each of the adjacent cells 2A, 2B is substantially identical to the cell 2 shown in FIGS. 2–3, and thus, additional detailed discussions of the elements of cells 2A, 2B are being omitted for simplicity. The elements of the adjacent cells 2A, 2B are marked with labels corresponding to the labels of FIGS. 2 and 3 with an "A" and a "B" added to the cells 2A and 2B, respectively.

The skin surface 18 shown in FIG. 4 includes a ridge 36 adjacent to the first cell 2A and a valley 38 adjacent to the second cell 2B. As a result, the first and second cells 2A, 2B will each produce different capacitive coupling responses in the sensor device 1. Accordingly, the first cell 2A will sense a smaller distance d1, signifying the ridge 36, than the second cell 2B, which senses a larger distance d2, signifying the valley 38. The distance d2 sensed by the second cell 2B will be the average of a distance d2a between the first plate 23B and the portion of the skin surface 18 directly above the first plate 23B and a distance d2b between the second plate 24B and the portion of the skin surface 18 directly above the second plate 24B. From a lumped-model point of view, this structure realizes a two series-connected capacitors scheme that can sense the difference between a contacting member, a ridge, and a non-contacting member, a valley.

Figure 5:
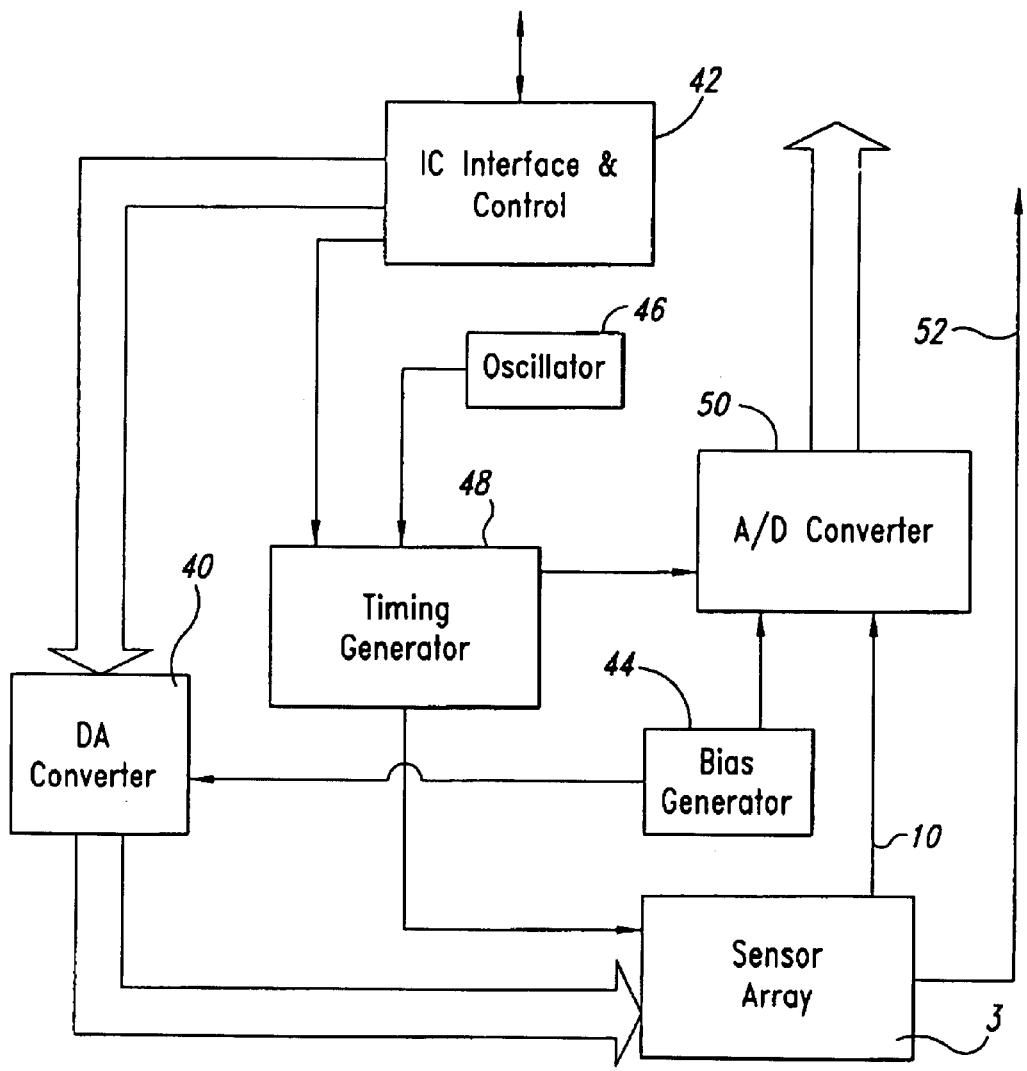
FIG. 5 is a block diagram of the sensor device shown in FIG. 1.

A block diagram of the sensor device 1 according to one embodiment of the invention is shown in FIG. 5. The sensor device 1 includes the sensor array 3 which is coupled by a digital to analog (D/A) converter 40 to an I²C interface and control device 42 and a bias generator 44. For simplicity, the horizontal and vertical scanners 5,6 and the output buffer 8 are not shown in FIG. 5, but are part of the sensor device 1 shown in FIG. 5. The sensor device 1 also includes an oscillator 46 and timing generator 48 coupled to the sensor array 3. The D/A converter 40, I²C interface and control device 42, bias generator 44, oscillator 46, and timing generator 48 together implement the functionality of the supply and logic unit 7 discussed above. The I²C interface and control device 42 provides a bidirectional communication protocol that enables the sensor device 1 to communicate with a controller, such as a standard computer. The D/A converter 40 converts digital control signals from the I²C interface and control device 42 into analog signals that are transmitted to the sensor array 3 to control the scanning of the cells 2 by the horizontal and vertical scanners 5,6. The D/A converter 42 also provides analog biases, such as the voltage step $V_r$. The timing generator 48 takes a single clock signal from the oscillator 46 and generates timing signals that are provided to the sensor array 3 under the control of the I²C interface and control device 42.

To enable the distance measurements (represented by voltages) to be output to the computer coupled to the sensor device 1, the sensor device includes an analog to /digital (A/D) converter 50 coupled between the output 10 of the sensor array 3 and the computer. The A/D converter 50 also is coupled to the bias generator 44 and timing generator 48 to enable the A/D converter 50 to convert the analog voltage measurements output by the sensor array 3 to digital signals that are recognized by the computer as distance measurements. The sensor array 3 also is directly coupled to the computer by a synchronization line 52 that provides the computer with synchronization signals that help the computer properly interpret the digital distance measurements received from the A/D converter 50.

Figure 6:
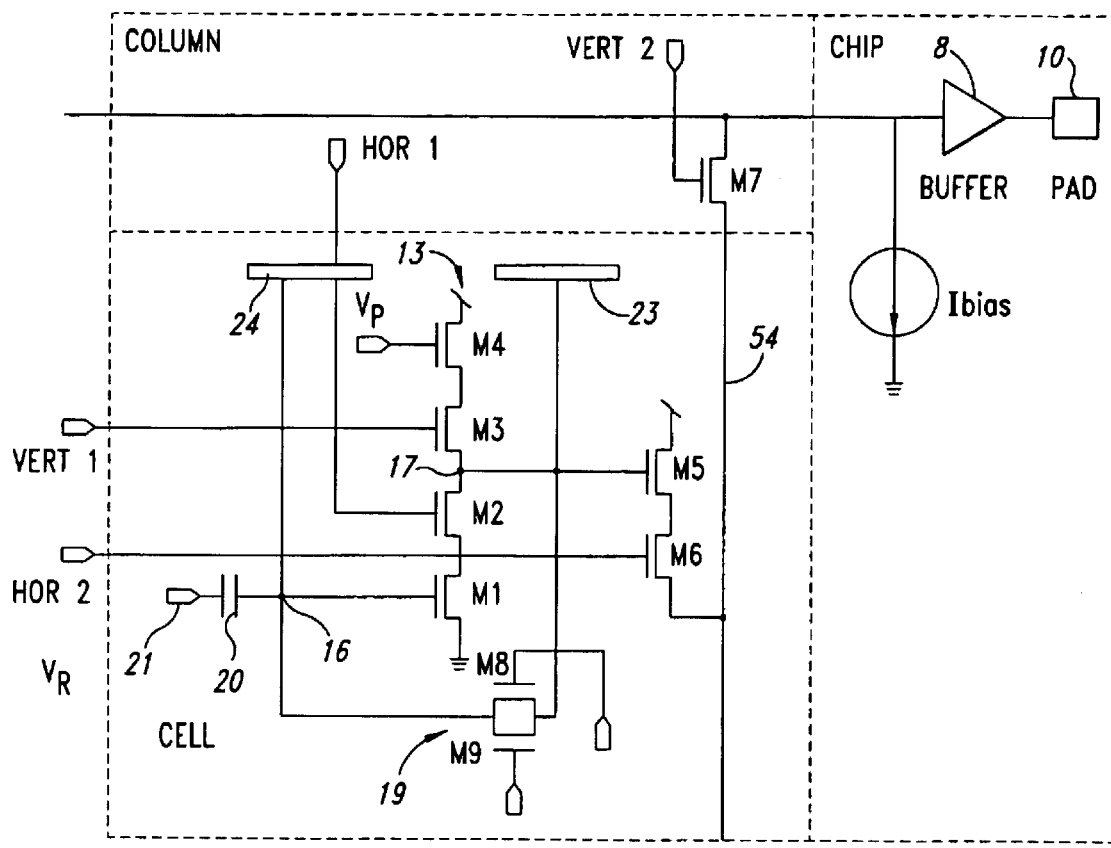
FIG. 6 is a circuit diagram of one embodiment of the cell shown in FIG. 2.

A detailed schematic of the cell 2 of FIG. 2 is illustrated in FIG. 6. The cell 2 includes first and second transistors M1, M2 of the N-channel type and third and fourth transistors M3, M4 of the P-channel type connected together in series to comprise a high gain cascode inverting amplifier 13. A first horizontal scan line (hor1) and a first vertical scan line (vert1) are coupled respectively from the horizontal and vertical scanners 5, 6 to the second transistor M2 and the third transistor M3 to ensure that only one cell at a time is powered, thereby limiting power consumption of non-addressed cells. A gate terminal of the first transistor M1 is coupled by the input capacitor 20 of the cell 2 to the cell input 21. $\Delta V_r$, as discussed above. When the voltage step $\Delta V_r$ is applied to the input node 21, a charge amount $dQ=C_i\Delta V_r$ is sinked from the amplifier input 16 as previously explained. This mode of operation is useful since by changing the amount of $\Delta V_r$, the sensor can deal with different ranges of sensed capacitances. The gate of the fourth transistor M4 is coupled to a fixed bias $V_p$.

The output 17 of the inverting amplifier 13 is buffered by a source follower stage (fifth transistor M5) into a vertical output line 54 by means of a sixth transistor M6. A seventh transistor M7 couples the vertical output line 54 to the output buffer 8 of the sensor device 1. The gate of the sixth transistor M6 is coupled by a second horizontal scan line (hor2) to the horizontal scanner 5 and the gate of the seventh transistor M7 is coupled by a second vertical scan line (vert2) to the vertical scanner 6, which ensures that only one cell at a time is communicating with the output buffer 8. This greatly reduces the output capacitance of the follower stage 46 since only one vertical output line at a time is connected to the output buffer 8.

The reset switch 19 is connected between the input 16 and output 17 of the inverting amplifier 13 as discussed above. The reset switch 19 is designed to prevent charge injection in the input 16 from saturating the inverting amplifier 13. If the switch-off transient of the reset switch 19 is slow enough compared to the inverse of the gain bandwidth product of the inverting amplifier 13, most of the channel charge of the reset switch is injected into the output node. The reset switch 19 includes eighth and ninth transistors M8, M9 with their drain terminals coupled together to the input 16 and their source terminals coupled together to the output 17. The size of the eighth transistor M8 is small in order to reduce the absolute amount of injected charge. Reducing the dimension of the eighth transistor M8 degrades the stability of the inverting amplifier 13 since it reduces the loop gain-bandwidth. In this design, the ninth transistor M9 is stronger than the eighth transistor M8 and is activated at a different phase than the eighth transistor M8 is introduced. During the reset phase, both transistors M8, M9 are set, reducing resistance of the feedback loop so output ringing is contained. During charge integration, the ninth transistor M9 is first opened so its channel charge is absorbed by the eighth transistor M8. Finally, the eighth transistor M8 is opened by a slow gate transient to ensure low charge-injection on the input.

Figure 7:
FIG. 7 is an image of a fingerprint obtained from the sensor device shown in FIG. 1.

In a preferred embodiment, the chip is made using a 0.7 $\mu$m CMOS digital process. The cell area is 65×65 $\mu m^2$, giving a 390 dpi resolution. A sample image 56 produced for a 200×200 window is shown in FIG. 7, which clearly shows gray levels. The image disappears as the finger is removed. The power consumption measured at 3 $\mu$s of a period cycle is 250 $\mu$W for the digital circuitry and 300 $\mu$W for the cell array 34 and buffer.

The sensor cells 2 described above are preferably formed using conventional silicon integrated circuit methodology. More particularly, all of the elements of the sensor device 1 shown in FIGS. 1–6 can be integrated on a single chip. Alternatively, one or more of the elements, such as the oscillator 46, can be made separately and coupled to the integrated elements of the sensor device 1.

The sensor device shown in FIGS. 1–6 has at least the following advantages. In particular, as stated, the sensor device provides for a high degree of precision with no need for complex processing of the output signal. Further, the sensor device may be produced easily and integrated using current microelectronic technology and is highly reliable, compact, and cheap to produce.

The sensor device according to the invention may also be used to advantage in other applications requiring precise detection of small distances.

Moreover, the simple design of each cell enables a large number of cells to be accommodated in array structures for detecting two-dimensional physical quantities.

Clearly, changes may be made to the device as described and illustrated herein without, however, departing from the scope of the present invention. In particular, if fabrication techniques enabling the formation of elastic structures (micromachining techniques) are available, the electrode whose distance is being measured may be connected directly to the input or output of inverting amplifier 13 to eliminate one of plates 23, 24. Moreover, all the components may be replaced by technical equivalents. For example, though an inverter such as inverting amplifier 13 is currently preferred for design and layout reasons, amplifier 13 may be implemented by any inverting or differential amplifier (e.g., an operational amplifier) in a charge amplifier configuration to increase the speed of the output signal.

What is claimed is:

1. An integrated sensor device for measuring a distance between the sensor device and an object, the sensor device comprising:

an insulating layer;

a plurality of output lines; and an array of distance detecting cells below the insulating layer and selectively connected to the output lines, each cell including an input terminal and an output terminal;

each cell further includes:

a first capacitor plate;

a second capacitor plate;

a horizontal scan line circuit coupled to each row of cells in the array for selectively enabling a row of cells; and a vertical scan line circuit coupled to each column of cells in the array for selectively enabling a column of cells, the horizontal scan line and the vertical scan lines together providing for selection of individual cells.

2. The device of claim 1 further including:

a voltage supply circuit coupled to the input terminal of each cell of the array; and a step voltage circuit means as part of the voltage supply circuit for selectively applying a step voltage to each cell of the array.

3. The distance sensor system of claim 1 further including:

an input capacitor coupled to the input terminal.

4. The distance sensor system of claim 1 wherein the insulating layer has a first surface that is adjacent to the first and second plates of each cell and a second surface that is configured to receive an object to be placed adjacent to the second surface to form first and second capacitances between the first plate and the object and the second plate and the object, respectively.

5. The distance sensor system of claim 1 wherein the object is a finger.

* * * * *